United States Patent
Yang et al.

(10) Patent No.: US 10,160,916 B2
(45) Date of Patent: Dec. 25, 2018

(54) COBALT METAL FOAM CATALYST, METHOD OF MAKING SAME, THERMAL-MEDIUM-CIRCULATING HEAT-EXCHANGE REACTOR USING SAME, AND METHOD OF PRODUCING A LIQUID FUEL BY MEANS OF A FISCHER-TROPSCH SYNTHESIS REACTION USING THERMAL-MEDIUM-CIRCULATING HEAT-EXCHANGE REACTOR

(71) Applicant: KOREA INSTITUTE OF ENERGY RESEARCH, Daejeon (KR)

(72) Inventors: Jung-Il Yang, Daejeon (KR); Heon Jung, Daejeon (KR); Dong-Hyun Chun, Daejeon (KR); Ji-Chan Park, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 9 days.

(21) Appl. No.: 15/075,688

(22) Filed: Mar. 21, 2016

(65) Prior Publication Data
US 2016/0200986 A1    Jul. 14, 2016

Related U.S. Application Data

(62) Division of application No. 13/579,070, filed as application No. PCT/KR2010/001187 on Feb. 25, 2010, now abandoned.

(30) Foreign Application Priority Data

Feb. 16, 2010 (KR) .......................... 10-2010-0013851

(51) Int. Cl.
*B01J 21/00*    (2006.01)
*C10G 2/00*    (2006.01)
(Continued)

(52) U.S. Cl.
CPC .... *C10G 2/34* (2013.01); *B01J 8/22* (2013.01); *B01J 23/75* (2013.01); *B01J 35/04* (2013.01);
(Continued)

(58) Field of Classification Search
USPC .......................................... 502/325, 100, 300
See application file for complete search history.

(56) References Cited

U.S. PATENT DOCUMENTS 3,513,109 A * 5/1970 Stiles ...................... B01J 23/34
                                                                    423/213.2
4,605,680 A    8/1986 Beuther et al.
(Continued)

FOREIGN PATENT DOCUMENTS

KR    1020020010673    2/2002
KR    1020020040777    5/2002
(Continued)

OTHER PUBLICATIONS

International Search Report—PCT/KR2010/001187 dated Mar. 17, 2011.

*Primary Examiner* — James E McDonough
(74) *Attorney, Agent, or Firm* — Cantor Colburn LLP (57) ABSTRACT

A thermal medium-circulated heat exchanger type reactor comprises: a tube unit configured such that synthesis gas is supplied to a cobalt catalyst layer filled with the cobalt metal foam catalysts each including a metal foam coated with cobalt catalyst powder to conduct a reaction; a shell unit configured to cover the tube unit such that thermal medium oil having a predetermined temperature is circulated to control reaction heat generated from a Fischer-Tropsch synthesis reaction; and an electric heater provided at the circumference of the shell unit to heat a cobalt catalyst layer to reduce and pretreat the cobalt catalyst layer.

8 Claims, 3 Drawing Sheets

(51) Int. Cl.
  *B01J 8/22* (2006.01)
  *B01J 23/75* (2006.01)
  *B01J 35/04* (2006.01)
  *B01J 37/02* (2006.01)
  *B01J 37/16* (2006.01)
  *B01J 23/00* (2006.01)
  *B01J 25/00* (2006.01)
  *B01J 29/00* (2006.01)

(52) U.S. Cl.
  CPC ....... *B01J 37/0205* (2013.01); *B01J 37/0217* (2013.01); *B01J 37/0219* (2013.01); *B01J 37/0225* (2013.01); *B01J 37/0238* (2013.01); *B01J 37/0244* (2013.01); *B01J 37/0248* (2013.01); *B01J 37/16* (2013.01); *C10G 2/332* (2013.01); *B01J 2208/00212* (2013.01); *C10G 2300/70* (2013.01)

(56) References Cited

U.S. PATENT DOCUMENTS

| | | | |
|---|---|---|---|
| 4,717,702 A | 1/1988 | Beuther et al. | |
| 5,157,054 A | 10/1992 | Herbolzheimer et al. | |
| 5,234,870 A * | 8/1993 | Osaka | B01J 13/0021 423/608 |
| 5,348,982 A | 9/1994 | Herbolzheimer et al. | |
| 5,422,375 A | 6/1995 | Rytter et al. | |
| 5,599,849 A | 2/1997 | Jager et al. | |
| 6,130,184 A | 10/2000 | Geerlings et al. | |
| 6,211,255 B1 | 4/2001 | Schanke et al. | |
| 6,537,945 B2 | 3/2003 | Singleton et al. | |
| 6,740,621 B2 | 5/2004 | Singleton et al. | |
| 7,045,486 B2 | 5/2006 | Wang et al. | |
| 7,160,577 B2 | 1/2007 | Ahn et al. | |
| 7,984,180 B2 | 7/2011 | Pope et al. | |
| 2004/0063799 A1* | 4/2004 | Wang | B01J 8/0285 518/721 |
| 2005/0165121 A1* | 7/2005 | Wang | B01J 19/0093 518/726 |
| 2006/0073276 A1* | 4/2006 | Antonissen | C23C 16/4412 427/248.1 |
| 2008/0161617 A1* | 7/2008 | Riley | C07C 2/66 585/449 |

FOREIGN PATENT DOCUMENTS

| | | |
|---|---|---|
| KR | 1020050006632 | 1/2005 |
| KR | 1020080060739 | 7/2008 |
| KR | 1020090037089 | 4/2009 |
| WO | 2005075606 | 8/2005 |

* cited by examiner

COBALT METAL FOAM CATALYST, METHOD OF MAKING SAME, THERMAL-MEDIUM-CIRCULATING HEAT-EXCHANGE REACTOR USING SAME, AND METHOD OF PRODUCING A LIQUID FUEL BY MEANS OF A FISCHER-TROPSCH SYNTHESIS REACTION USING THERMAL-MEDIUM-CIRCULATING HEAT-EXCHANGE REACTOR

TECHNICAL FIELD

The present invention relates to a method of manufacturing a cobalt metal foam catalyst including a metal foam coated with cobalt catalyst powder, a cobalt metal foam catalyst manufactured by the method, a thermal medium-circulated heat exchanger type reactor using the cobalt metal foam catalyst, and a method of producing liquid fuel by a Fischer-Tropsch synthesis reaction using the reactor. More particularly, the present invention relates to a catalyst, which is used to obtain high liquid fuel productivity even at a low CO conversion ratio because the reaction temperature can be kept stable by controlling the reaction heat with high efficiency during the Fischer-Tropsch synthesis reaction, so that the mass transfer characteristics in a catalyst layer can be improved, and to a method of manufacturing the catalyst, a reactor filled with the catalyst, and a method of producing liquid fuel using the reactor.

BACKGROUND ART

Generally, when liquid fuel is produced from synthesis gas by a Fischer-Tropsch synthesis reaction, technologies of producing liquid fuel by filling a fixed-bed reactor or a slurry reactor with a powdered catalyst and spherical or pelleted cobalt catalyst particles is used.

As prior arts of the Fischer-Tropsch synthesis reaction using a cobalt catalyst, U.S. Pat. No. 4,605,680 discloses a technology of manufacturing a cobalt catalyst supported with gamma-alumina or eta-alumina and activated with a group IIIB or IVB metal oxide, and U.S. Pat. No. 4,717,702 discloses a technology of manufacturing a cobalt catalyst having high dispersibility and a small particle size using an impregnation solution including an organic solvent. Further, U.S. Pat. No. 6,130,184 discloses an example of developing a high-activity cobalt catalyst by transforming a catalyst precursor and a carrier precursor, and U.S. Pat. Nos. 6,537,945 and 6,740,621 disclose technologies related to the development of a catalyst having improved thermal stability and wear resistance, respectively.

Meanwhile, as prior arts related to the development of a reactor for the Fischer-Tropsch synthesis reaction, in the case of a slurry reactor, U.S. Pat. Nos. 5,422,375 and 5,599,849 disclose technologies related to the development of an inner filter for separating a catalyst, and U.S. Pat. Nos. 5,157,054 and 5,348,982 disclose technologies related to the mixing of a catalyst and reactants. Further, in the case of a fixed-bed reactor, U.S. Pat. No. 6,211,255 discloses a technology related to a fixed-bed reactor filled with a monolith catalyst for improving the mass transfer characteristics and heat transfer characteristics of reactants and products in the reactor, and Korean Patent Nos. 2008-0060739 and 2009-0037089 disclose technologies related to a fixed-bed reactor filled with a metal structure catalyst for improving the mass transfer characteristics and heat transfer characteristics of reactants and products in the reactor. Further, U.S. Pat. No. 7,984,180 discloses a technology for effectively controlling reaction heat in a microchannel reactor using a cobalt catalyst.

However, as described in the above prior arts, when conventional powdered or particulate cobalt catalysts are used, there are problems in that it is very difficult to control reaction temperature because of the extremely high exothermic reaction that occurs during the Fischer-Tropsch synthesis process, and in that it is difficult to selectively obtain various products including gaseous products, such as $CH_4$, $CO_2$ and the like, and liquid products, such as gasoline, diesel, wax and the like, because the temperature of the reaction cannot be easily controlled.

Therefore, it is required to develop a catalyst which can be used to control the reaction heat and selectively produce liquid fuel and can be used to replace conventional catalysts.

Further, in the slurry reactor, it is required to develop a high-efficiency filter for separating liquid products and fine catalyst particles, and, even in the fixed-bed reactor whose mass transfer characteristics and heat transfer characteristics are somewhat improved thanks to the development of a metal structure catalyst. It is also required to develop a high-efficiency fixed-bed reactor for efficiently recovering reaction heat because the reactor will be scaled up in the future.

SUMMARY OF THE INVENTION

Accordingly, the present invention has been devised to solve the above-mentioned problems, and an object of the present invention is to provide a method of manufacturing a cobalt metal foam catalyst including a metal foam coated with cobalt catalyst powder, wherein the cobalt metal foam catalyst is used to obtain high liquid fuel productivity even at a low CO conversion ratio because it can keep the reaction temperature stable by controlling reaction heat with high efficiency during a Fischer-Tropsch synthesis reaction and it can improve the mass transfer characteristics in a catalyst layer.

Another object of the present invention is to provide a thermal medium-circulated heat exchanger type reactor using the cobalt metal foam catalyst, wherein the cobalt metal foam catalyst is used to obtain high liquid fuel productivity even at a low CO conversion ratio because it can keep the reaction temperature stable by controlling the reaction heat with high efficiency during the Fischer-Tropsch synthesis reaction and it can improve the mass transfer characteristics in a catalyst layer.

Still another object of the present invention is to provide a method of producing liquid fuel, wherein liquid fuel can be produced in a high yield even at a low CO conversion ratio using the thermal medium-circulated heat exchanger type reactor using the cobalt metal foam catalyst which can keep the reaction temperature stable by effectively recovering reaction heat and can improve the mass transfer characteristics in a catalyst layer.

In order to accomplish the above objects, an aspect of the present invention provides a method of manufacturing a cobalt metal foam catalyst including a metal foam coated with cobalt catalyst powder, including the steps of: surface-pretreating a metal foam by atomic layer deposition (ALD) using trimethylaluminum $((CH_3)_3Al)$ and water to form an $Al_2O_3$ thin film; preparing a cobalt catalyst slurry composed of a mixture of alumina sol, a cobalt catalyst and isopropyl alcohol; surface-coating the surface-pretreated metal foam with the cobalt catalyst slurry by dip coating; and drying and calcinating the surface-pretreated metal foam coated with the cobalt catalyst slurry.

The metal foam may be made of any one selected from the group consisting of aluminum, iron, stainless steel, iron-chromium-aluminum alloy (Fe—Cr—Al alloy), nickel-chromium alloy, copper-nickel alloy, aluminum-copper alloy, zinc-copper alloy and silver-copper alloy.

The cobalt catalyst slurry may be prepared by mixing a mixed solution including alumina sol and isopropyl alcohol with cobalt catalyst powder such that a mixing ratio of the mixed solution to the cobalt catalyst powder is 10:1~1:5.

The mixed solution including alumina sol and isopropyl alcohol may be prepared by mixing alumina sol including alumina and water with isopropyl alcohol, and the mixed solution has a viscosity of 1~50 cP.

The cobalt catalyst may be prepared by impregnating a support selected from the group consisting of alumina ($Al_2O_3$), silica ($SiO_2$) and titania ($TiO_2$) with a cobalt precursor selected from the group consisting of cobalt nitrate ($Co(NO_3)_2 6H_2O$) and cobalt acetate (($CH_3CO_2)_2Co4H_2O$).

The dip coating and drying may be repetitively performed several times such that the surface of the metal foam is coated with the cobalt catalyst to form a thin film which has strong adhesivity to the surface of the metal foam.

Another aspect of the present invention provides a cobalt metal foam catalyst including a metal foam coated with cobalt catalyst powder, manufactured by the method, wherein, when a Fischer-Tropsch synthesis reaction is performed using the metal foam catalyst, the reaction temperature is maintained constant at an initial reaction temperature of 190~250° C. in spite of the high exothermic reaction heat, and a high liquid fuel productivity of 98.2 $mL_{liquid\ fuel}/(kg_{catalyst}*hr)$ is obtained even at a low CO conversion ratio of 46.8%.

Still another aspect of the present invention provides a thermal medium-circulated heat exchanger type reactor, including: a tube unit configured such that synthesis gas is supplied to a cobalt catalyst layer filled with the cobalt metal foam catalysts each including a metal foam coated with cobalt catalyst powder, each of the metal foam and the cobalt catalyst powder having been manufactured by the method of any one of claims 1 to 6, to conduct a reaction; a shell unit configured to cover the tube unit such that thermal medium oil having a predetermined temperature is circulated to control reaction heat generated from a Fischer-Tropsch synthesis reaction; and an electric heater provided at the circumference of the shell unit to heat a cobalt catalyst layer to reduce and pretreat the cobalt catalyst layer.

The thermal medium-circulated heat exchanger type reactor may further include: a heat exchange pin protruding from an outer surface of the tube unit to accelerate heat exchange between the tube unit and the thermal medium oil.

The thermal medium oil may be supplied by a thermal medium oil storage tank supplying thermal medium oil to the lower portion of the shell unit through a thermal medium oil supply line and recovering high-temperature thermal medium oil discharged from the upper portion of the shell unit through a thermal medium oil recovery line and then storing the high-temperature thermal medium oil; a thermal medium oil circulation pump provided along the thermal medium oil supply line to supply the thermal medium oil stored in the thermal medium oil storage tank; and a heat exchanger provided along the thermal medium oil supply line located behind the thermal medium oil circulation pump to perform heat exchange between the cooling water and the thermal medium oil to control the reaction temperature.

The electric heater for heating the cobalt catalyst layer to reduce and pretreat the cobalt catalyst layer may be configured such that the cobalt catalyst layer is heated to 300~500° C.

The circumference of thermal medium storage tank may be provided with a heater to control the temperature of the stored thermal medium oil.

Still another aspect of the present invention provides a method of producing liquid fuel by a Fischer-Tropsch synthesis reaction using a thermal medium-circulated heat exchanger type reactor, wherein the thermal medium-circulated heat exchanger type reactor using the cobalt metal foam catalyst including a metal foam coated with cobalt catalyst powder is used, and exothermic reaction heat generated by the Fischer-Tropsch synthesis reaction occurring in the cobalt metal foam catalyst layer of the tube unit is controlled by thermal medium oil circulating in the shell unit at a reaction temperature of 190~250° C. and a reaction pressure of 20~25 atm, and simultaneously the reaction is conducted, thus producing liquid fuel.

The reaction may be performed while increasing the heat exchange efficiency using a heat exchange pin provided on an outer surface of the tube unit during the Fischer-Tropsch synthesis reaction.

The exothermic reaction heat recovered by the thermal medium oil of the shell unit may be removed by a heat exchanger that controls the temperature of the thermal medium oil using external cooling water to maintain the temperature of the thermal medium oil constant.

The temperature of the thermal medium oil may be adjusted to 190~250° C.

The cobalt catalyst layer may be reduced and pretreated by heating it to 300~500° C.

According to the present invention, when a cobalt metal foam catalyst including a metal foam coated with cobalt catalyst powder is manufactured such that the problem of controlling the reaction temperature by recovering the reaction heat, which is considered as the greatest problem in the Fischer-Tropsch synthesis reaction for making liquid fuel from carbon monoxide and hydrogen, can be effectively solved, thanks to the metal properties of the metal foam, high liquid fuel productivity can be obtained even at a low CO conversion ratio because the cobalt metal foam catalyst can keep the reaction temperature stable by controlling the reaction heat with high efficiency even when carrying out the Fischer-Tropsch synthesis and can improve the mass transfer characteristics of a catalyst layer.

Further, according to the thermal medium-circulated heat exchanger type reactor and the method of producing liquid fuel using the reactor, the reaction heat removed by the cobalt metal foam catalyst including the metal foam coated with cobalt catalyst powder can be efficiently recovered, so that the reaction temperature can be kept stable, thereby producing liquid fuel in a high yield. Therefore, it is expected that the thermal medium-circulated heat exchanger type reactor and the method of producing liquid fuel using the reactor will find useful application in industrial fields.

In particular, the method of producing liquid fuel according to the present invention, which is a method of directly producing liquid fuel from a small amount of natural gas on site at the actual location, is a very effective energy utilization technology, and is a very strong requirement of the diversification of various energy sources and the security of being able to provide energy to deal with ultrahigh oil prices.

DESCRIPTION OF THE REFERENCE NUMERALS IN THE DRAWINGS

1: metal foam
2: cobalt catalyst powder
3: cobalt metal foam catalyst
201: tube unit
202: shell unit
203: electric heater
204: cobalt metal foam catalyst
205: heat exchange pin
206: thermal medium oil storage tank
207: thermal medium oil storage tank heater
208: thermal medium oil circulation pump
209: heat exchanger
210: switching valve
211: hydrogen mass flow controller (MFC)
212: carbon monoxide mass flow controller
213: nitrogen mass flow controller
221: synthesis gas supply line
222: nitrogen supply line
223: air injection unit
224: thermal medium oil recovery unit
231: thermal medium oil
232: thermal medium oil supply line
233: thermal medium oil recovery line
241: cooling water line
251: liquid fuel product recovery unit

DETAILED DESCRIPTION OF THE INVENTION

Hereinafter, preferred embodiments of the present invention will be described in detail with reference to the accompanying drawings. Further, in the description of the present invention, when it is determined that the detailed description of the related art would obscure the gist of the present invention, the description thereof will be omitted.

Figure 1:
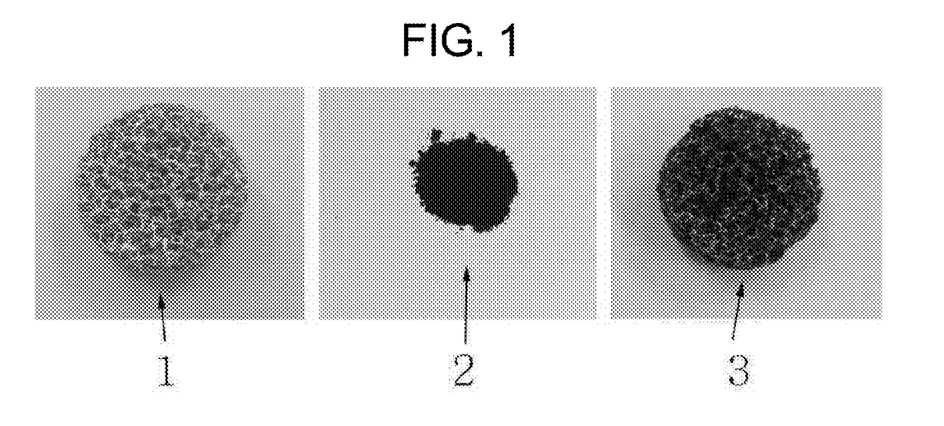
FIG. 1 is a photograph showing a cobalt metal foam catalyst in which a metal foam surface-pretreated by ALD is coated with cobalt catalyst powder according to the present invention.
Figure 2:
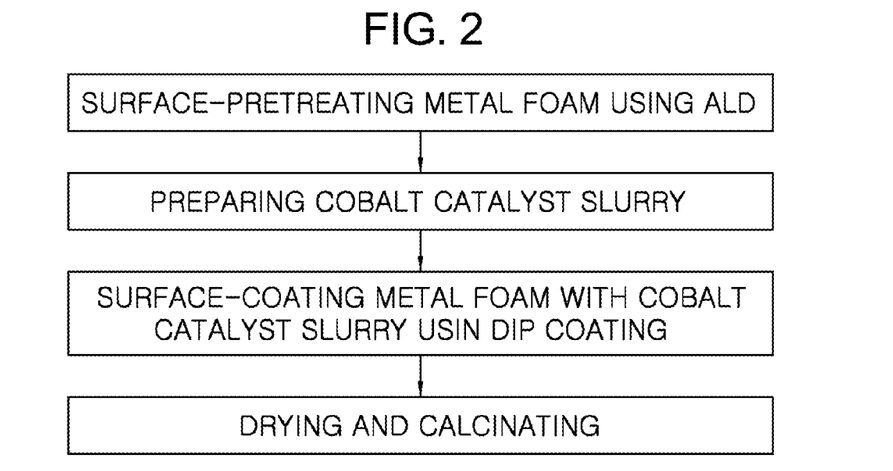
FIG. 2 is a flowchart showing a method of manufacturing the cobalt metal foam catalyst according to the present invention.

FIG. 1 is a photograph showing a cobalt metal foam catalyst 3 in which a metal foam 1 surface-pretreated by ALD is coated with cobalt catalyst powder 2 according to the present invention, and FIG. 2 is a flowchart showing a method of manufacturing the cobalt metal foam catalyst 3 according to the present invention.

As shown in FIGS. 1 and 2, the cobalt metal foam catalyst in which the metal foam surface-pretreated by ALD is coated with the cobalt catalyst powder is manufactured by coating the surface of the metal foam with a slurry composed of a mixture of alumina sol, cobalt catalyst powder and isopropyl alcohol.

Conventionally, a fixed-bed reactor or a slurry reactor using a powdered catalyst or a spherical or pelleted particulate catalyst has been used as a reactor for carrying out a Fischer-Tropsch synthesis reaction. In contrast, when the cobalt metal foam catalyst manufactured by the method of the present invention is used, the reaction heat generated during the Fischer-Tropsch synthesis reaction can be efficiently removed to control the reaction temperature stable because of the metal properties of the metal foam, and liquid fuel, which is a reaction product, is efficiently transferred to the outside of a catalyst layer by the improved mass transfer characteristics because the metal foam is coated with cobalt catalyst powder and so forms a thin film, thereby achieving high liquid fuel productivity even at a low CO conversion ratio.

The method of manufacturing the cobalt metal foam catalyst according to the present invention includes the steps of: surface-pretreating a metal foam by atomic layer deposition (ALD) using trimethylaluminum (($CH_3$)$_3$Al) and water to form an $Al_2O_3$ thin film; preparing a cobalt catalyst slurry composed of a mixture of alumina sol, a cobalt catalyst and isopropyl alcohol; surface-coating the surface-pretreated metal foam with the cobalt catalyst slurry by dip coating; and drying and calcinating the surface-pretreated metal foam coated with the cobalt catalyst slurry.

As the cobalt catalyst, any catalyst may be used as long as it is generally used in Fischer-Tropsch synthesis. Preferably, the cobalt catalyst may be a catalyst prepared by impregnating a support, such as alumina ($Al_2O_3$), silica ($SiO_2$), titania ($TiO_2$) or the like, with a cobalt precursor, such as cobalt nitrate ($Co(NO_3)_2 6H_2O$), cobalt acetate (($CH_3CO_2$)$_2$Co$4H_2O$) or the like.

The metal foam is made of aluminum, iron, stainless steel, iron-chromium-aluminum alloy (Fe—Cr—Al alloy), nickel-chromium alloy, copper-nickel alloy, aluminum-copper alloy, zinc-copper alloy or silver-copper alloy. The metal foam is used to form a stable $Al_2O_3$ thin film and coat cobalt catalyst powder because it has heat transfer properties and high adhesivity to the surface of the metal foam. Preferably, the metal foam may be made of any one of iron-chromium-aluminum alloy (Fe—Cr—Al alloy), nickel-chromium alloy, copper-nickel alloy, aluminum-copper alloy, zinc-copper alloy and silver-copper alloy. Particularly, copper-nickel alloy is most effective at forming the stable initial interlayer that is necessary to form an $Al_2O_3$ thin film on the surface of the metal foam in the process of surface-pretreating the metal foam.

Atomic layer deposition (ALD) is a process of surface-treating a metal foam to evenly coat the surface of the metal foam with a cobalt catalyst. ALD is a process of forming a compact $Al_2O_3$ thin film on the surface of the metal foam using trimethylaluminum and water.

The reason for this is that it is difficult to form a stable interface on the surface of the metal foam because the properties of the metal foam are different from those of the catalyst which includes inorganic matter as a main component. Therefore, in order to solve this problem, an interlayer having properties similar to those of a catalyst including inorganic matter as a main component is formed on the surface of the metal foam.

Since the surface of the metal foam is completely covered with an $Al_2O_3$ thin film by ALD, the surface property of the metal foam is changed to that of $Al_2O_3$, which is inorganic matter.

That is, the uniform $Al_2O_3$ thin film that completely covers the surface of the metal foam is not formed by a general coating method, and can be formed only by the ALD of the present invention.

In the present invention, the cobalt catalyst slurry applied onto the surface of the metal foam pretreated by ALD is prepared by mixing alumina sol, cobalt catalyst powder and isopropyl alcohol.

In the composition of the cobalt catalyst slurry, the mixing ratio of a mixed solution of alumina sol and isopropyl alcohol to cobalt catalyst powder may be 10:1~1:5.

Here, when the mixing ratio of the mixed solution of alumina sol and isopropyl alcohol to cobalt catalyst powder is more than the upper limit, the concentration of the cobalt catalyst slurry is excessively low, so that the adhesivity of the cobalt catalyst slurry is very low, with the result that it is difficult to form a catalyst coating layer on the surface of the metal foam. Further, when the mixing ratio thereof is less than the lower limit, the concentration of the cobalt catalyst slurry is excessively high, so that the thickness of the catalyst coating layer formed on the surface of the metal foam increases, with the result that the amount of catalyst particles which fail to be exposed to the surface of the coating layer increases, thereby increasing the loss of catalyst particles which are active in the Fischer-Tropsch synthesis.

Further, the mixed solution including alumina sol and isopropyl alcohol is prepared by mixing alumina sol including alumina and water with isopropyl alcohol. The mixed solution is configured such that its viscosity is 1~50 cP. The reason for limiting the numerical value of the viscosity is because it is difficult to suitably apply the cobalt catalyst slurry onto the surface of the metal foam when the viscosity thereof is less than the lower limit or more than the upper limit.

Figure 3:
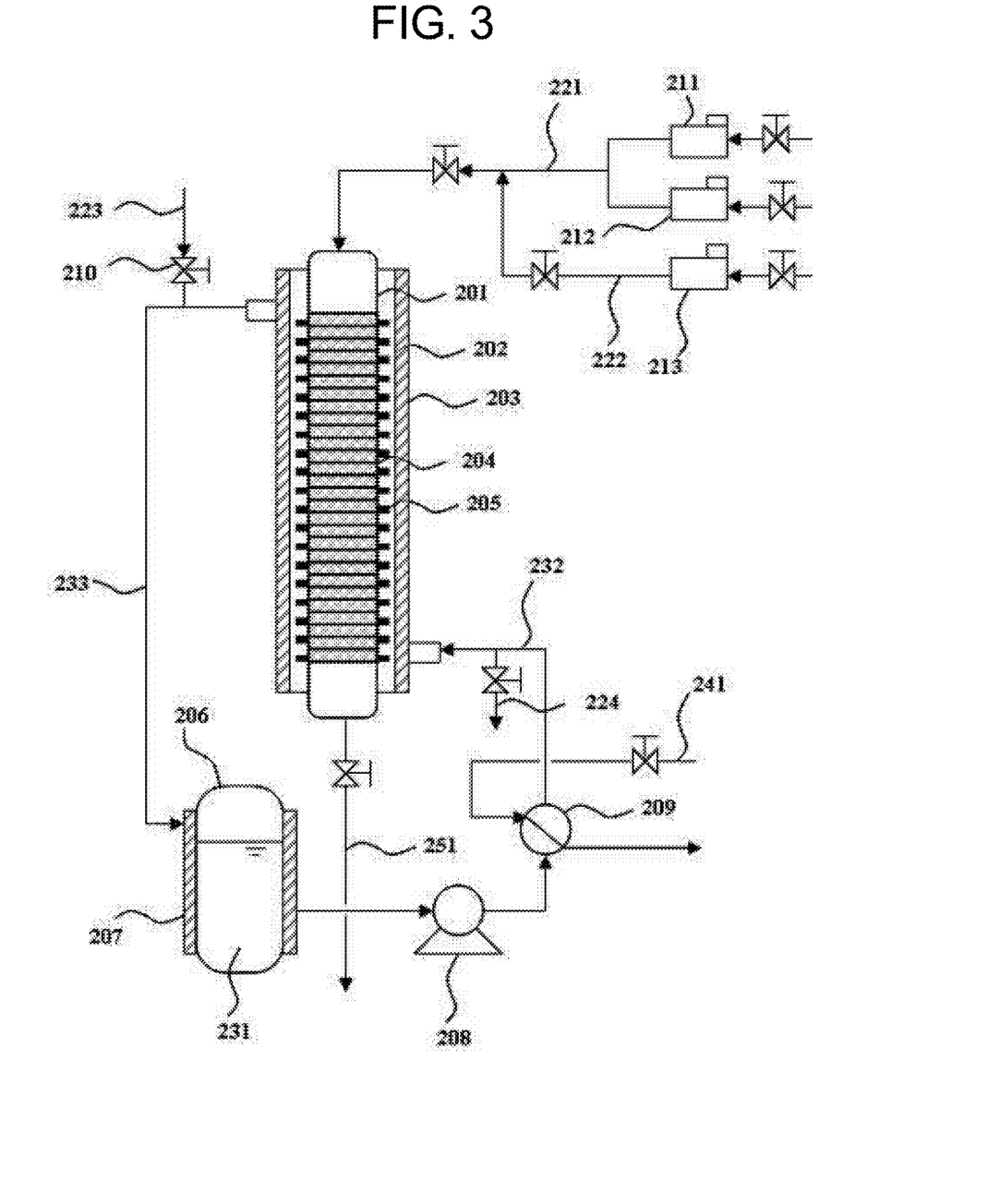
FIG. 3 is a schematic view showing a thermal medium-circulated heat exchanger type reactor according to the present invention.

FIG. 3 is a schematic view showing a thermal medium-circulated heat exchanger type reactor according to the present invention.

As shown in FIG. 3, the thermal medium-circulated heat exchanger type reactor according to the present invention is configured such that the problem of pressure drop which occurs during a Fischer-Tropsch synthesis reaction is effectively solved and such that the reaction heat in the Fischer-Tropsch synthesis reaction, which is a strong exothermic reaction, can be efficiently controlled, so that the reaction temperature can be controlled and kept stable and the mass transfer characteristics of a catalyst layer can be improved, thereby producing liquid fuel in a high yield even when the CO conversion ratio is low. Without providing this thermal medium-circulated heat exchanger type reactor, when the Fischer-Tropsch synthesis reaction is carried out, the loss of active catalyst particles charged in a reactor is large, which is inefficient, and the reaction temperature is not easily controlled.

In order to solve such a problem, the thermal medium-circulated heat exchanger type reactor according to the present invention includes: a tube unit 201 configured such that synthesis gas is supplied to a cobalt catalyst layer 204 filled with a plurality of cobalt metal foam catalysts each including a metal foam coated with cobalt catalyst powder to carry out a reaction; a shell unit 202 configured to cover the tube unit 201 such that thermal medium oil having a predetermined temperature is circulated to control the reaction heat generated from the Fischer-Tropsch synthesis reaction; a heat exchange pin 205 protruding from the outer surface of the tube unit 201 to accelerate the heat exchange between the tube unit 201 and the thermal medium oil; an electric heater 203 provided at the circumference of the shell unit 202 to heat a cobalt catalyst layer to reduce and pretreat the cobalt catalyst layer; a thermal medium oil storage tank 206 supplying the thermal medium oil 231 to the lower portion of the shell unit 202 through a thermal medium oil supply line 232 and recovering high-temperature thermal medium oil discharged from the upper portion of the shell unit 201 through a thermal medium oil recovery line 233 and then storing the high-temperature thermal medium oil; a thermal medium oil circulation pump 208 provided along the thermal medium oil supply line 232 to supply the thermal medium oil stored in the thermal medium oil storage tank 206; and a heat exchanger 209 provided along the thermal medium oil supply line 232 located behind the thermal medium oil circulation pump 208 to perform heat exchange between cooling water and thermal medium oil to control reaction temperature.

The thermal medium storage tank 206 is provided at the circumference thereof with a heater 207 to control the temperature of the stored thermal medium oil.

Further, the thermal medium oil supply line 232 is provided with a thermal medium oil recovery unit 224 to control the amount of the thermal medium oil discharged from the thermal medium storage tank 206.

Further, the thermal medium oil recovery line 233 is provided with an air injection unit 223 for injecting air when the circulated thermal medium oil is recovered by the thermal medium oil recovery unit 224 provided in the thermal medium oil supply line 232 and provided with a switching valve 210 that controls the injection of air.

The top of the tube unit 201 is connected to a mixed gas supply line 221 for supplying a mixed gas of hydrogen passing through a hydrogen mass flow controller 211 and carbon monoxide passing through a carbon monoxide mass flow controller 212. Also, the mixed gas supply line 221 is connected to a nitrogen supply line 222 for supplying nitrogen passing through a nitrogen mass flow controller 213. Further, the bottom of the tube unit 201 is connected to a liquid fuel product recovery unit 251 for recovering liquid fuel produced while passing through the cobalt catalyst layer 204 provided in the tube unit 201.

The electric heater 203 for heating the cobalt catalyst layer to reduce and pretreat the cobalt catalyst layer 204 is configured such that the cobalt catalyst layer 204 is heated to 300~500° C. When the cobalt catalyst layer is heated to below the lower limit, it is difficult to activate a cobalt catalyst, although the activation of the cobalt catalyst is necessary for carrying out the Fischer-Tropsch synthesis reaction for producing liquid fuel. Further, when the cobalt catalyst layer is heated to above the upper limit, it is difficult to maintain the stability of the cobalt catalyst at high temperature.

The temperature of the thermal medium oil is maintained at 190~250° C. When the temperature thereof is below the lower limit, it is difficult to run the Fischer-Tropsch synthesis reaction. Further, when the temperature thereof is above the upper limit, during the Fischer-Tropsch synthesis reaction, undesirable side reactions, such as the formation of an excess amount of gaseous products ($CH_4$, $CO_2$, etc.), catalyst coking ascribed to carbon deposition causing catalytic deactivation and the like, frequently occur, compared to the production of liquid fuel.

The above-configured thermal medium-circulated heat exchanger type reactor using the cobalt metal foam catalyst including a metal foam coated with cobalt catalyst powder according to the present invention can effectively and rapidly control the exothermic reaction heat that is generated by the Fischer-Tropsch synthesis reaction occurring in the cobalt metal foam catalyst layer of the tube unit by using the thermal medium oil circulating in the shell unit at a predetermined temperature. Further, the heat exchange pin provided on the outer surface of the tube unit can increase the heat exchange efficiency. Also, the exothermic reaction heat that is recovered by the thermal medium oil of the shell unit is removed by the exchanger controlling the temperature using external cooling water, so that the temperature of the thermal medium oil of the shell unit is maintained constant.

As the result of performing the Fischer-Tropsch synthesis reaction using the cobalt metal foam catalyst of the present invention and the thermal medium-circulated heat exchanger type reactor of the present invention under the conditions of a reaction temperature of 190~250° C. and a reaction pressure of 20~25 atm, first, the problem of pressure drop in the reaction operation was effectively solved. Further, the reaction heat generated by the Fischer-Tropsch synthesis reaction, which is an extremely exothermic reaction, was efficiently controlled, so that the reaction temperature was kept stable and the mass transfer characteristics in the catalyst layer was improved, thereby obtaining high liquid fuel productivity even at a low CO conversion ratio.

The reason for limiting the numerical value ranges of the reaction temperature and reaction pressure is because the highest production yield was obtained in these numerical value ranges.

Figure 4:
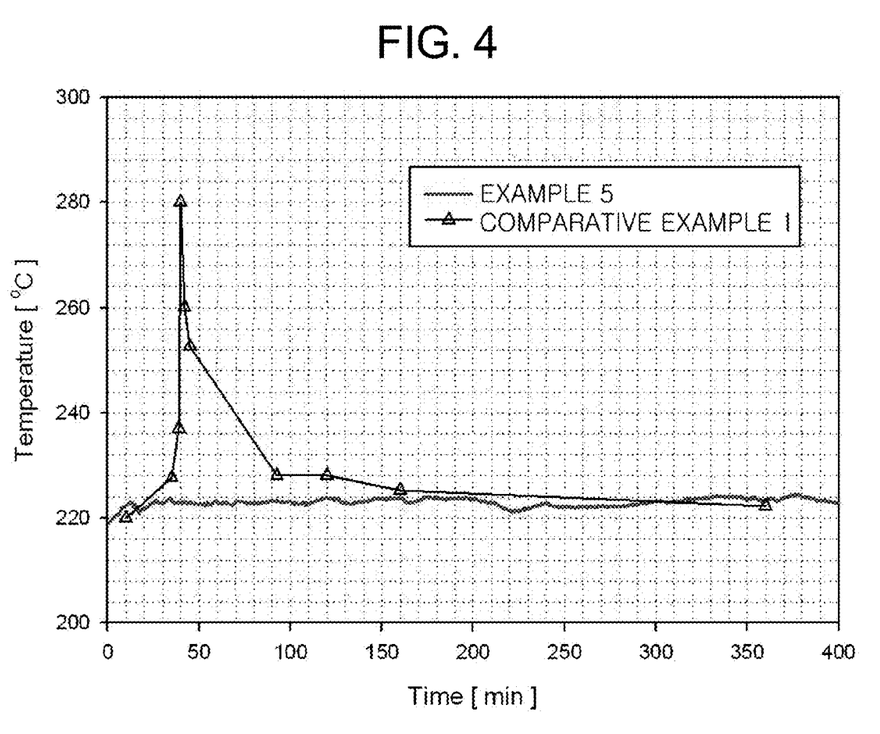
FIG. 4 is a graph comparing the results of reaction temperatures obtained from the Fischer-Tropsch synthesis reaction using the thermal medium-circulated heat exchanger type reactor filled with the cobalt metal foam catalyst with those obtained from the Fischer-Tropsch synthesis reaction using the conventional fixed-bed reactor filled with a spherical cobalt catalyst.

FIG. 4 is a graph comparing the results of reaction temperatures obtained from the Fischer-Tropsch synthesis reaction using the thermal medium-circulated heat exchanger type reactor filled with the cobalt metal foam catalyst with those obtained from the Fischer-Tropsch synthesis reaction using the conventional fixed-bed reactor filled with a spherical cobalt catalyst.

As shown in FIG. 4, when the Fischer-Tropsch synthesis reaction was performed using the thermal medium-circulated heat exchanger type reactor filled with the cobalt metal foam catalyst, very stable reaction temperature control results (results according to Example 5) were obtained. In contrast, when the Fischer-Tropsch synthesis reaction was performed using the conventional fixed-bed reactor filled with a spherical cobalt catalyst, irregular reaction temperature control results (results according to Comparative Example 1) were obtained.

As shown in FIG. 4, when the initial reaction temperature of the Fischer-Tropsch synthesis reaction using the thermal medium-circulated heat exchanger type reactor filled with the cobalt metal foam catalyst was set 190~250° C., the reaction temperature was maintained constant at the initial reaction temperature even when the Fischer-Tropsch synthesis reaction, which is an extremely exothermic reaction, was ran for a long period of time because the reaction temperature was controlled stable by controlling the reaction heat with high efficiency. Further, in this case, the mass transfer characteristics of the cobalt metal foam catalyst were improved, so that high liquid fuel productivity was obtained even at a low CO conversion ratio (results according to Example 5)

As described above, from the Fischer-Tropsch synthesis reaction using the thermal medium-circulated heat exchanger type reactor filled with the cobalt metal foam catalyst according to the present invention, it can be ascertained that the reaction temperature can be controlled stable by controlling the reaction heat with high efficiency, and the mass transfer characteristics of the cobalt metal foam catalyst can be improved, so that high liquid fuel productivity can be obtained even at a low CO conversion ratio.

Hereinafter, the present invention will be described in more detail with reference to the following Examples and Comparative Example. However, the scope of the present invention is not limited to these Examples.

The CO conversion ratio, liquid fuel yield, liquid fuel productivity and hydrocarbon yield in Example 5 and Comparative Example 1 are defined as follows.

CO conversion=reacted CO moles/supplied CO moles*100=(supplied CO moles−unreacted CO moles)/supplied CO moles*100

Liquid fuel yield=produced liquid fuel (gasoline, diesel, wax) moles/supplied CO moles*100

Liquid fuel productivity=liquid fuel produced per hour (gasoline, diesel, wax)/used catalyst Hydrocarbon yield=produced hydrocarbon (ethane, propane, butane, gasoline, diesel, wax) moles/supplied CO moles*100

Example 1

To pretreat metal foam to be used in catalyst surface coating, in order to form an $Al_2O_3$ thin film, a metal foam (diameter: 22 mm, thickness: 4 mm) made of an copper-nickel alloy was surface-treated by atomic layer deposition (ALD) using trimethylaluminum $(CH_3)_3Al$ and water. In the first step, trimethylaluminum (TMA) was supplied. The supplied TMA reacts with a hydroxyl group (—OH) present on the surface of the metal to form a metal-O—Al bond. In the second step, residual TMA and $CH_4$ (reaction side products) are washed with an inert gas such as nitrogen, argon or the like. In the third step, water is supplied. The unreacted methyl group present on the surface of the metal reacts with the supplied water to form an Al—OH bond. In the fourth step, water (unreacted reactant) and $CH_4$ are removed using inert gas in the same manner as in the second step. While carrying out these four steps, a monolayer film is formed, and this is defined as one cycle. In the following step, the supplied TMA reacts with Al—OH to form an Al—O—Al bond. Therefore, the surface of the metal is chemically bonded, not physically adhered to, with an $Al_2O_3$ thin film to form a surface thin film, and the thickness of the surface thin film can be adjusted in a range of 1~100 nm by adjusting the number of cycles in the ALD process.

Example 2

In order to prepare a catalyst slurry to be applied onto the surface-treated metal foam, 50 g of alumina sol, 15 g of cobalt catalyst powder and 20 mL of isopropyl alcohol were mixed to prepare a cobalt catalyst slurry.

Example 3

The surface-treated metal foam was coated with the prepared cobalt catalyst slurry by dip coating, dried at 120° C., and then calcinated at 400° C. to manufacture a cobalt metal foam catalyst.

Example 4

A thermal medium-circulated heat exchanger type reactor including a tube unit filled with a cobalt metal foam catalyst and a shell unit in which a thermal medium circulates was made of a double tube including an inner tube having a diameter of 1 inch and an outer tube having a diameter of 2 inches. The length of the reactor was 430 mm. The inner tube of the tube unit having a diameter of 1 inch was filled with eighty cobalt metal foam catalysts, and the outer surface of the tube unit was provided with a heat exchange pin for the purpose of efficient heat exchange. In the outer tube having a diameter of 2 inches of the shell unit, thermal medium oil, the temperature of which is controlled constant at 222° C. by an additional exchanger using external cooling water, was circulated by an oil pump, and the thermal medium oil having passed through the shell unit of the heat exchanger type reactor was recovered into a thermal medium oil storage tank and then recirculated by the oil pump. Three thermocouples was provided in the center of the tube unit filled with cobalt metal foam catalysts at 200 mm intervals depending on the height of a cobalt metal foam catalyst layer to measure the reaction temperature. In order to reduce and pre-treat the cobalt metal foam catalyst layer, the heat exchanger type reactor was heated to 300° C. using an electric heater provided on the outer circumference of the shell unit.

Example 5

The Fischer-Tropsch synthesis reaction was ran by supplying $H_2$ at a flow rate of 200 mL/min and CO at a flow rate of 100 mL/min as reactants using the eighty cobalt metal foam catalysts and the thermal medium-circulated heat exchanger type reactor under the conditions of a reaction temperature of 222° C. and a reaction pressure of 20 atm. In the Fischer-Tropsch synthesis reaction using the cobalt metal foam catalysts and the thermal medium-circulated heat exchanger type reactor, during the reaction, the reaction temperature was maintained constant at the initial reaction temperature regardless of the high exothermic reaction heat. As a result, the CO conversion was 46.8%, liquid fuel yield was 31.4%, liquid fuel productivity was 98.2 $mL_{liquid\ fuel}/(kg_{catalyst}*hr)$, and hydrocarbon yield was 37.5%.

Comparative Example 1

In order to compare the reaction activity obtained from the Fischer-Tropsch synthesis reaction using the cobalt metal foam catalyst of Example 5 and the thermal medium-circulated heat exchanger type reactor with that obtained from running a Fischer-Tropsch synthesis reaction using a general spherical cobalt catalyst and a general fixed-bed reactor, the Fischer-Tropsch synthesis reaction was performed by filling the fixed-bed reactor with 4.5 g of the spherical cobalt catalyst and supplying $H_2$ at a flow rate of 67 mL/min and CO at a flow rate of 33 mL/min as reactants under the conditions of a reaction temperature of 220° C. and a reaction pressure of 20 atm.

Immediately after initiation of the reaction, there was a sudden rise in the reaction temperature, which increased to 280° C. in 40 minutes, so that the catalyst was deactivated by the precipitation of carbon, with the result that the Fischer-Tropsch synthesis reaction did not proceed, and thus liquid fuel was not produced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A thermal medium-circulated heat exchanger type reactor, comprising:
   a tube unit comprising an outer heat exchange surface having a circumference, wherein a synthesis gas is supplied into an upper portion of the tube unit through a synthesis gas supply line and a liquid fuel product is recovered through a lower portion of the tube unit;
   a cobalt metal-foam catalyst layer disposed inside the tube unit;
   a shell unit that fully surrounds the circumference of the outer heat exchange surface of the tube unit to form a space between the tube unit and the shell unit, wherein a thermal medium oil having a predetermined temperature is supplied into a lower portion of the space through a thermal medium oil supply line and recovered from an upper portion of the space through a thermal medium oil recovery line;
   an electric heater provided at the circumference of the shell unit to heat the cobalt metal-foam catalyst layer to thereby reduce and pretreat the cobalt metal-foam catalyst layer; and
   a heat exchange pin protruding from an outer surface of the tube unit to accelerate heat exchange between the tube unit and the thermal medium oil,
   wherein a Fischer-Tropsch synthesis reaction takes place inside the tube unit by the cobalt metal-foam catalyst layer to produce the liquid fuel product from the synthesis gas,
   the thermal medium oil circulating the space controls heat generated by the Fischer-Tropsch synthesis reaction,
   the metal-foam of the cobalt metal-foam catalyst layer comprises any one of iron-chromium-aluminum alloy, nickel-chromium alloy, copper-nickel alloy, aluminum-copper alloy, zinc-copper alloy, or silver-copper alloy, and
   the metal-foam was pre-treated by atomic layer deposition to form an $Al_2O_3$ thin film on the surface of the metal-foam.

2. The thermal medium-circulated heat exchanger type reactor according to claim 1, further comprising: a thermal medium oil storage tank to which the thermal medium oil supply line and the thermal medium oil recovery line are connected.

3. The thermal medium-circulated heat exchanger type reactor according to claim 2, further comprising: a thermal medium oil circulation pump provided on the thermal medium oil supply line to supply the thermal medium oil stored in the thermal medium oil storage tank; and a heat exchanger provided on the thermal medium oil supply line to perform heat exchange between a cooling water and the thermal medium oil to control the predetermined temperature.

4. The thermal medium-circulated heat exchanger type reactor according to claim 1, wherein the electric heater is configured to heat the cobalt metal-foam catalyst layer to 300~500° C.

5. The thermal medium-circulated heat exchanger type reactor according to claim 3, wherein the thermal medium storage tank is provided with a heater to control a temperature of the thermal medium oil stored therein.

6. A thermal medium-circulated heat exchanger type reactor, comprising:
   a tube unit comprising an outer heat exchange surface having a circumference, wherein a synthesis gas is supplied into an upper portion of the tube unit through a synthesis gas supply line and a liquid fuel product is recovered through a lower portion of the tube unit;
   a cobalt metal-foam catalyst layer disposed inside the tube unit;

a shell unit that fully surrounds the circumference of the outer heat exchange surface of the tube unit to form a space between the tube unit and the shell unit, wherein a thermal medium oil having a predetermined temperature is supplied into a lower portion of the space through a thermal medium oil supply line and recovered from an upper portion of the space through a thermal medium oil recovery line;

an electric heater provided at the circumference of the shell unit to heat the cobalt metal-foam catalyst layer to thereby reduce and pretreat the cobalt metal-foam catalyst layer, wherein the electric heater is configured to heat the cobalt metal-foam catalyst layer to 300~500° C.; and a heat exchange pin protruding from an outer surface of the tube unit to accelerate heat exchange between the tube unit and the thermal medium oil, a thermal medium oil storage tank to which the thermal medium oil supply line and the thermal medium oil recovery line are connected, wherein the thermal medium storage tank is provided with a heater to control a temperature of the thermal medium oil stored therein;

a thermal medium oil circulation pump provided on the thermal medium oil supply line to supply the thermal medium oil stored in the thermal medium oil storage tank; and a heat exchanger provided on the thermal medium oil supply line to perform heat exchange between a cooling water and the thermal medium oil to control the predetermined temperature;

wherein a Fischer-Tropsch synthesis reaction takes place inside the tube unit by the cobalt metal-foam catalyst layer to produce the liquid fuel product from the synthesis gas, the thermal medium oil circulating the space controls heat generated by the Fischer-Tropsch synthesis reaction, and the metal-foam comprises a copper-nickel alloy that was pre-treated by atomic layer deposition to form an $Al_2O_3$ thin film on the surface of the metal-foam.

7. The thermal medium-circulated heat exchanger type reactor according to claim 1, wherein the metal-foam of the cobalt metal-foam catalyst layer comprises aluminum, iron, iron-chromium-aluminum alloy, nickel-chromium alloy, copper-nickel alloy, aluminum-copper alloy, zinc-copper alloy, or silver-copper alloy.

8. The thermal medium-circulated heat exchanger type reactor according to claim 7, wherein the metal-foam comprises a copper-nickel alloy that was pre-treated by atomic layer deposition to form an $Al_2O_3$ thin film on the surface of the metal-foam.

* * * * *